United States Patent Office 3,740,294
Patented June 19, 1973

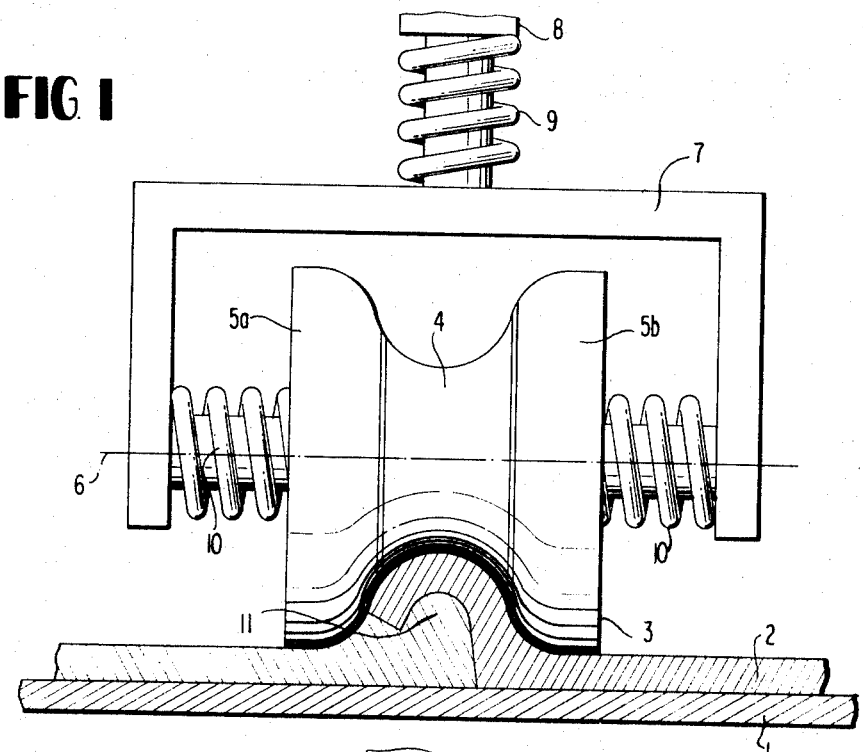
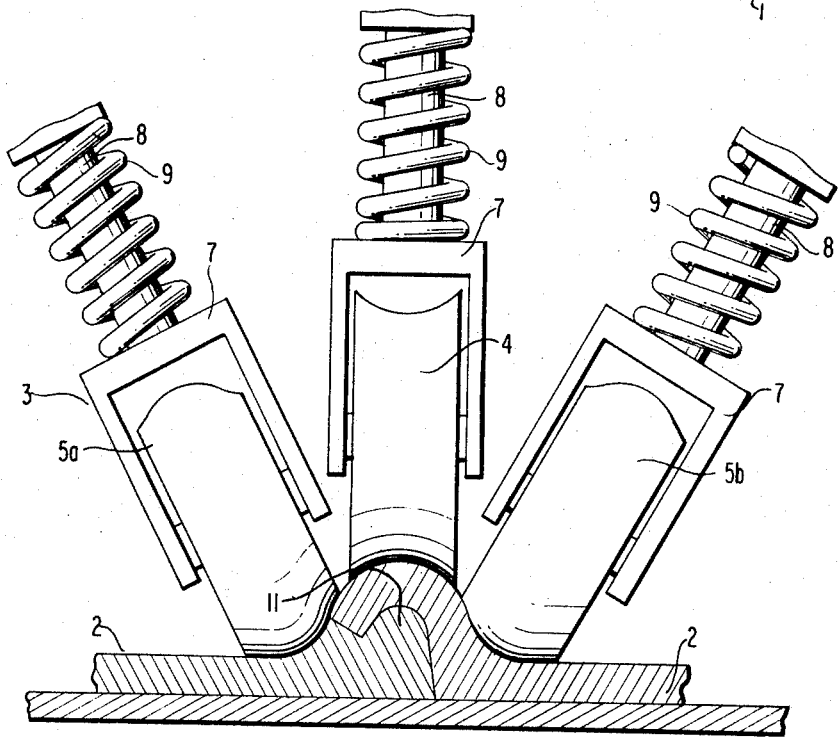

3,740,294
APPARATUS FOR THE PRODUCTION OF WOUND PIPE OF THERMOPLASTIC SYNTHETIC MATERIAL
Michael Wienand, Siegburg, Klaus Jensen, Buisdorf, Franz Primessing, Mondorf, and Franz-Werner Alfter, Siegburg, Germany, assignors to Dynamit Nobel Aktiengesellschaft, Troisdorf, Germany
Filed Sept. 3, 1970, Ser. No. 69,251
Claims priority, application Germany, Sept. 3, 1969,
P 19 44 600.5
Int. Cl. B31c 13/00
U.S. Cl. 156—429                                    11 Claims

ABSTRACT OF THE DISCLOSURE

An apparatus for producing a wound pipe of thermoplastic synthetic resin, wherein a profiled band of thermoplastic, having one edge provided with a tongue and the other edge thereof provided with a bead containing a groove for receiving said tongue, is wound spirally in the softened condition about a rotating mandrel whereby the tongue of a preceding winding lap is continuously received in the groove of the bead of the immediately subsequent winding lap, comprising a rotatable drum means, at least one pressure roll associated with said drum means and a means, preferably a series of take-off rolls, for removing the finished pipe from the drum means. The pressure roll comprises three sectional rolls having a contour which corresponds to the junction point between successive windings of thermoplastic, the three sectional rolls substantially covering the junction point. Using this device, a uniform contact pressure and, thus, a uniform and satisfactory welding bond is obtained between the tongue and groove thermoplastic windings.

BACKGROUND OF THE INVENTION

This invention relates to an apparatus for the production of wound pipe of thermoplastic synthetic material. More particularly, it relates to an apparatus comprising a rotatable drum and several marginal pressure rolls for producing said pipe from a profiled band of thermoplastic synthetic resin.

German patent application No. P 17 04 593.1, corresponding to U.S. Pat. 3,606,670 and U.S. application No. 178,706, describe a process for the production of wound pipe of a thermoplastic synthetic material, such as polyvinyl chloride or polyethylene, wherein a profiled band of thermoplastic, one edge of the band exhibiting a tongue and the other edge thereof exhibiting a bead with a groove for receiving the web (i.e., a tongue, stem or projection), is wound in the plasticized or softened condition spirally about a rotating drum which serves as the mandrel in such a manner that the tongue of a preceding winding lap is continuously received in the groove of the bead of the immediately subsequent winding lap. The finished pipe formed after the junction points (i.e., the weld seam or site of connection) have solidified is continuously taken off from the drum.

An apparatus is also disclosed in the above-mentioned German patent application for conducting the described process which comprises a rotatable drum and several marginal pressure rolls disposed in the zone of the drum in a radial fashion at equal spacings with respect to the shell surface of the cylindrical drum portion. This apparatus also includes a device for the take-off of the finished wound pipe.

SUMMARY OF THE INVENTION

The present invention is concerned with an improved apparatus for conducting the above-described process for producing wound pipe of thermoplastic synthetic material.

Accordingly, one of the objects of the present invention is to provide an apparatus for producing wound pipe of thermoplastic synthetic material which overcomes the disadvantages and deficiencies of the prior art.

Another object of the invention is to provide a procedure and means for obtaining a uniform and satisfactory welding bond in the manufactured pipe.

These and other objects and advantages of the present invention will become apparent to those skilled in the art from a consideration of the following specification and claims, taken in conjunction with the accompanying drawings.

In accordance with the present invention, at least one of the said pressure rolls is formed of three sectional rolls adapted in their contour to the weld seam or junction point, these rolls together substantially covering the junction point. In a further advantageous embodiment of the present invention, the provision is made that the three sectional rolls are disposed at a minor interstice side-by-side on a common axle. In this connection, one spring is provided, respectively, on the outer side of each of the two external sectional rolls on the common axle and, furthermore, an additional spring is arranged at right angles (vertically) with respect thereto, the force of the latter spring being effective in the direction of the junction point of the profiled band or strip.

In accordance with a further embodiment of the present invention, it has been found advantageous to dispose each of the three sectional rolls on an individual axle, wherein the axles are then inclined with respect to one another in an appropriate manner. Each sectional roll is provided with its own spring so that the rolls are pressed against the junction points, i.e., the points where the spirally wound band is joined together.

Both arrangements exhibit the essential advantage that the pressure rolls and adapt themselves very well to variations in the profile dimensions, so that even in such a case a uniform contact pressure and, thus, a uniform and satisfactory welding bond is ensured between the profile edges provided with a groove and those provided with a tongue, web, lobe or projection.

Insofar as the take-off equipment is concerned, it is preferred that the same be constructed in the form of several take-off rolls which are disposed preefrably at uniform spacings so that they are distributed over the periphery of the pipe and, also, are offset with respect to one another in the direction of the pipe axis in correspondence with the pitch of the profile. Means are also provided for a radial adjustability so that the adjustment of these take-off rolls can be adapted to the respective pipe diameter. Spindles are suitably provided as the adjustment mechanism.

In still a further embodiment of the invention, it is advantageous to employ a speed-controlled drive motor for driving the take-off rolls. Optionally, a transmission for the necessary step-up or step-down conversion of the speed of rotation can be connected after the motor. A single drive motor can be employed for all of the take-off rolls. However, it is also possible and may be advantageous in a particular case to drive each roll by means of a separate motor. When employing a single drive motor, as well as when using several drive motors, it is advantageous to dispose a universal joint shaft between the motor and the take-off roll, so that it is possible to provide a fixed mounting for the motor, whereas the take-off rolls, depending on the particular requirement, can be shifted or adjusted in the desired manner, especially with their axes, with respect to the axis of the pipe to be produced in accordance with the intended pitch of the profile.

In order to take into account as optimally as possible any occurring variations of the dimensions of the profiled band and/or the pitch of the profile, i.e., to ensure as accurate an adjustment as possible at all times, the take-off rolls are adjusted in dependence on the arrival point of the profiled band at the drum. For this purpose, a device is provided which constantly scans this point. This device is connected with the take-off rolls via a servomotor.

In accordance with the present invention, an accurate setting of the number of rotations (speed) of the drive motor or of the drive motors for the take-off rolls is ensured by effecting this setting in dependence on the respective sag of the profiled band between the extruding tool and the point of arrival at the drum, wherein this sag is continuously measured by means of photocells. Furthermore, in order to be sure that the driving power is transmitted to the pipe to be taken off without any large amount of slippage, it has been found to be desirable to provide the contact surface of the take-off rolls with a rubber or elastomeric coating.

BRIEF DESCRIPTION OF THE DRAWINGS

The present invention is shown in the accompanying drawings in connection with several preferred embodiments and will now be explained below with reference thereto. In the drawings:

FIG. 1 shows a tripartite pressure (contact) roll with a common axle;

FIG. 2 shows a tripartite pressure roll with individual axles;

DETAILED DESCRIPTION OF THE PREFERRED EMBODIMENTS

Figure 3:
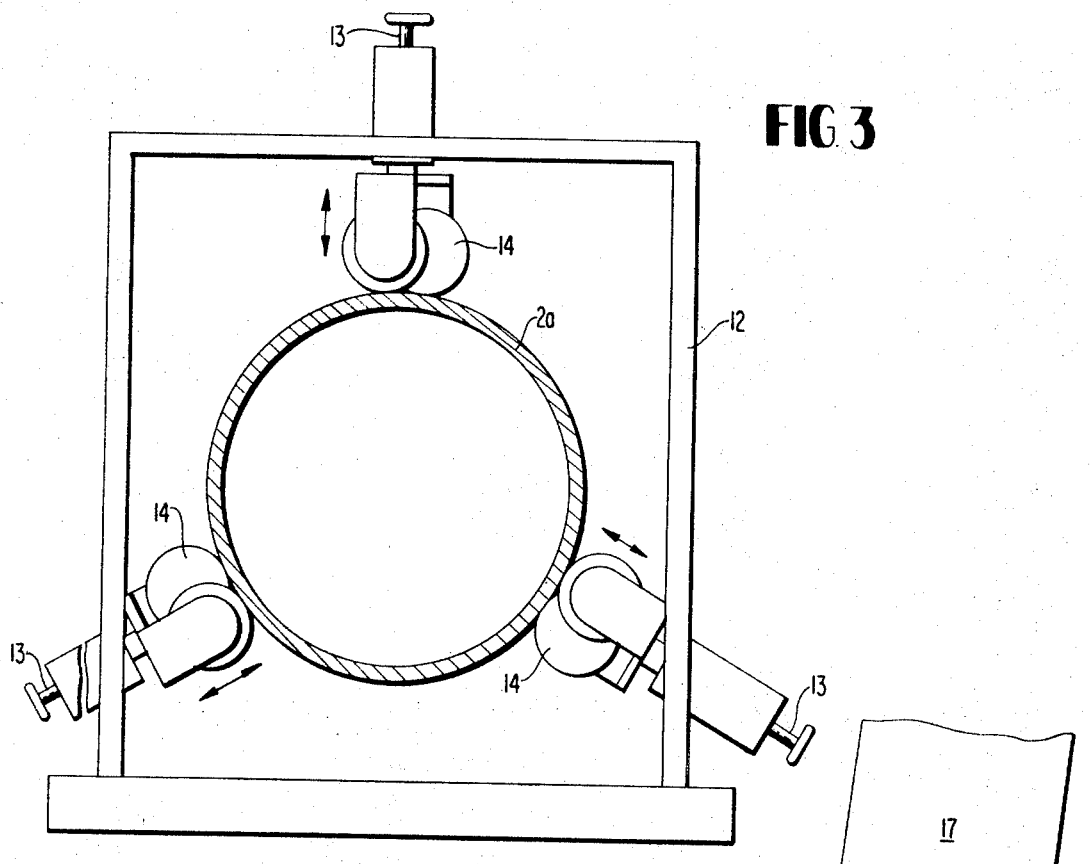
FIG. 3 shows an example for the arrangement of the take-off rolls.

According to FIG. 1, the three parts 4, 5a and 5b of the pressure roll 3 are disposed on the common axle 6. The axle 6 is attached to the frame 7, and the latter is affixed to the rod 8. By means of the springs 9 and 10, the pressure roll 3, adapted in its contour to the junction point 11 of the profiled band 2, is elastically and resiliently (preferably by means of a spring) pressed against the junction point of the profiled band 2 in contact with the drum 1. The spring 9 permits the vertical movability of the entire roll 3, and the springs 10 permit the horizontal movability of the roll parts 5a and 5b. Hence, the pressure roll 3 can, in each case, automatically adapt itself to the cross-sectional dimension of the profiled band 2 in the zone of the junction point 11 and, yet, a satisfactory contact pressure and, accordingly, a satisfactory welding bond is ensured.

Corresponding conditions also exist in the construction of the pressure roll 3 according to FIG. 2. In this illustration, each of the three sectional rolls 4, 5a and 5b is rotatably mounted with an axis inclined with respect to the other two axes, at an individual frame 7. Each of these frames 7 is spring-resiliently pressed toward or against the junction point 11 of the profiled band 2 placed on the drum 1 by means of the spring 9 disposed on the rod 8. In a corresponding fashion, each roll part 4, 5a and 5b can adapt itself in this embodiment, independently of the two other roll parts, to any possible fluctuations and variations of the cross-sectional dimensions of the profiled band.

Figure 4:
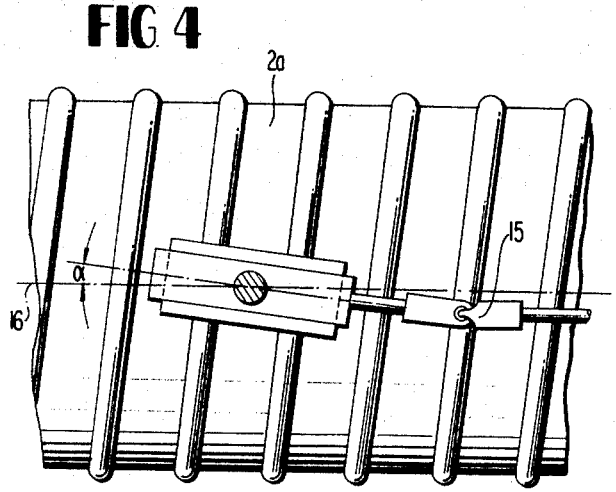
FIG. 4 shows a fragmentary view of an example for the adjustment of the take-off rolls.

According to FIG. 3, the take-off rolls 14 are disposed at uniform spacings around the wound pipe 2a shown in cross-section. These take-off rolls are attached to the common frame assembly 12 and are adjustable in the radial direction by means of the spindles 13. In this connection, the take-off rolls 14 are attached to the frame assembly 12 so that they can be rotated in the plane of their axes of rotation. Accordingly, they can be adjusted in accordance with the respective pitch of the profile, i.e., the axis of the take-off roll can be adjusted so that it is inclined with respect to the axis 16 of the wound pipe 2a by a corresponding angle α, for example, by means of the universal joint (cardan shaft) 15 shown in FIG. 4.

Figure 5:
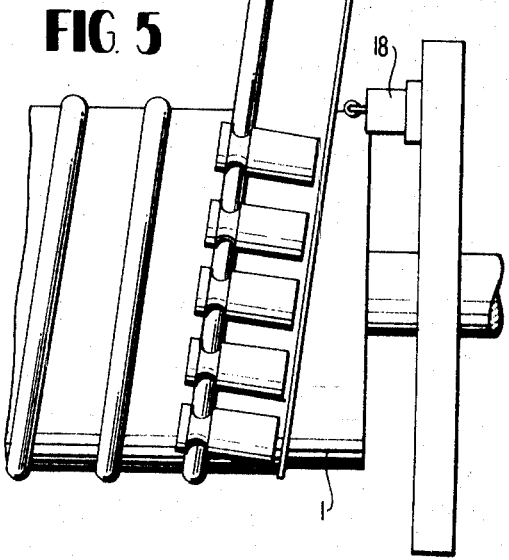
FIG. 5 shows an arrangement with a device for scanning the arrival point of the profile.

The point at which the profiled band 2 exiting from the extruder 17 arrives at the drum 1 is continuously scanned, according to FIG. 5, by means of the device 18, i.e., a photocell in correspondence with its axial position with respect to the drum surface. The inclined position of the take-off rolls 14 is correspondingly adjusted in a manner not shown in the drawing via a servomotor. In place of the one-piece pressure rolls shown in the drawing, it is of course, also possible to use the pressure rolls 3 of FIGS. 1 and 2.

The method and apparatus of the present invention may be employed with thermoplastic synthetic resins suitably and conventionally employed for the manufacture of pipes. Specific examples thereof include polyolefins, such as polyethylene and polypropylene; polystyrene, polyvinyl resins, such as polyvinyl chloride, polyvinylidene chloride, polytetrafluoroethylene, and the like; polycarbonates; polyamides such as nylon; and various cellulose materials, such as cellulose acetate, cellulose acetate-butyrate, cellulose nitrate, etc. Polyvinyl chloride, polyethylene and polypropylene are the preferred thermoplastic synthetic resins. The size of the pipes per se may be adjusted as desired, depending upon the particular circumstances, both as to diameter and as to length.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. An apparatus for producing a wound pipe of thermoplastic synthetic resin, wherein a profiled band of thermoplastic, one edge of which is provided with a tongue and the other edge of which is provided with a bead containing a groove for receiving said tongue, is woung spirally in the softened condition about a rotating mandrel in such a manner that the tongue of a preceding winding lap is continuously received in the groove of the bead of the immediately subsequent winding lap forming a seam, comprising a rotatable drum means serving as said mandrel, at least one pressure roll means associated with said drum means and a means for removing the finished pipe from said drum means, said pressure roll means comprising a plurality of sectional rolls substantially covering said seam and combined to provide a contour which exerts a substantially uniform contact pressure on said seam.

2. An apparatus in accordance with claim 1, wherein said pressure roll means comprises three sectional rolls disposed side-by-side in close proximity to each other on a common axle means, said sectional rolls being subjected to the force of a first spring means disposed on the outer side of each of the two external sectional rolls on said common axle means and to the force of a second spring means disposed at right angles with respect to said first spring means, the force of said second spring means being effective in the direction of the seam of the profiled band of thermoplastic.

3. An apparatus in accordance with claim 1, wherein said pressure roll means comprises three sectional rolls disposed side-by-side on mutually inclined, respective axle means, each of said sectional rolls being subjected to the force of a spring means biased in the direction towards said seam.

4. An apparatus in accordance with claim 2, wherein said common axle means is held in a radially and axially resilient manner.

5. An apparatus in accordance with claim 1, wherein the means for removing the finished pipe from the drum means comprises at least two take-off rolls disposed over the periphery of the pipe which are offset with respect to one another in accordance with the pitch of the profile in the direction of the pipe axis, said take-off rolls being adjustable in the radial direction and driven by at least one speed-controllable drive motor means.

6. An apparatus in accordance with claim 5, wherein the take-off rolls are radially adjustable by means of spindles.

7. An apparatus in accordance with claim 5, wherein the take-off rolls are each driven individually.

8. An apparatus in accordance with claim 5, wherein said drive means includes a transmission gear mechanism connected thereto.

9. An apparatus in accordance with claim 5, wherein the drive is effected by way of at least one universal joint shaft means disposed between the drive motor means and the take-off rolls.

10. An apparatus in accordance with claim 5, wherein the axes of said take-off rolls are adapted to be adjusted with respect to the axis of the finished pipe in accordance with the intended pitch of the profile of thermoplastic.

11. An apparatus in accordance with claim 5, wherein the contact surface of said take-off rolls is provided with an elastomeric coating.

References Cited

UNITED STATES PATENTS

| | | | |
|---|---|---|---|
| 3,173,822 | 3/1965 | Rigaut | 156—429 |
| 2,245,758 | 6/1941 | Chernack | 156—431 |
| 3,089,535 | 5/1963 | Vohrer et al. | 156—443 |
| 1,883,401 | 10/1932 | Rolfs et al. | 156—428 |
| 2,489,503 | 11/1949 | Sampson et al. | 156—429 |

DANIEL J. FRITSCH, Primary Examiner

U.S. Cl. X.R.

156—195, 446, 459, 501